(12) United States Patent
Abe et al.

(10) Patent No.: US 7,197,510 B2
(45) Date of Patent: Mar. 27, 2007

(54) METHOD, SYSTEM AND PROGRAM FOR GENERATING STRUCTURE PATTERN CANDIDATES

(75) Inventors: Mari Abe, Yokohama (JP); Masahiro Hori, Yokohama (JP); Kohichi Ono, Tokyo-to (JP); Teruo Koyanagi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/767,518

(22) Filed: Jan. 29, 2004

(65) Prior Publication Data
US 2004/0210573 A1   Oct. 21, 2004

(30) Foreign Application Priority Data
Jan. 30, 2003   (JP)   ............................. 2003-022380

(51) Int. Cl.
*G06F 17/30*   (2006.01)
(52) U.S. Cl. .......................... 707/102; 707/6; 707/101; 707/103 R; 707/104.1; 709/217; 715/513; 715/523
(58) Field of Classification Search .............. 707/1–10, 707/100–104.1, 201; 715/513, 514, 517, 715/530, 523; 709/217, 219
See application file for complete search history.

(56) References Cited

U.S. PATENT DOCUMENTS
5,694,609 A * 12/1997 Murata ........................ 715/513

(Continued)

FOREIGN PATENT DOCUMENTS
JP        7-225771       8/1995

OTHER PUBLICATIONS

Ohtsuki, Mika et al., "Structured Document Framework for Design Patterns Based on SGML", Proceedings of the 21st Annual International Conference on Computer Software and Application, Aug. 13-15, 1997, pp. 320-323.*

(Continued)

*Primary Examiner*—Shahid Alam
(74) *Attorney, Agent, or Firm*—Ryan, Mason & Lewis, LLP

(57) ABSTRACT

A structure pattern candidate generating system is disclosed for automatically generating many kinds of complicated structure pattern candidates and facilitating selection of a structure pattern suitable for the purpose. When the system is provided with a structure pattern pointing to an element or an element set in a document logical structure of a structured document, that has been specified by a user, a method for determining an item to be edited determines an item to be edited among the items composing the structure pattern. A method for generating structure pattern candidates replaces the item to be edited with items in different expressions based on the document logical structure information about the structured document to generate structure pattern candidates. A method for generating a structure pattern candidate list arranges the generated structure pattern candidates based on a condition and index for display for giving selection criteria to the user to generate a structure pattern candidate list. If the system is provided with an item desired to be edited, that has been specified by the user for the structure pattern, the method for determining an item to be edited determines the item desired to be edited as the item to be edited.

13 Claims, 12 Drawing Sheets

U.S. PATENT DOCUMENTS

| | | | |
|---|---|---|---|
| 6,061,697 A * | 5/2000 | Nakao | 715/513 |
| 6,424,980 B1 * | 7/2002 | Iizuka et al. | 715/513 |
| 6,564,256 B1 * | 5/2003 | Tanaka | 709/219 |
| 7,039,625 B2 * | 5/2006 | Kim et al. | 707/1 |
| 7,054,854 B1 * | 5/2006 | Hattori et al. | 707/3 |
| 7,092,938 B2 * | 8/2006 | Brown et al. | 707/4 |
| 7,099,861 B2 * | 8/2006 | Youn | 707/3 |
| 2001/0014900 A1 * | 8/2001 | Brauer et al. | 707/513 |
| 2003/0093760 A1 * | 5/2003 | Suzuki et al. | 715/523 |

OTHER PUBLICATIONS

Souad, Tayeb-Bey et al., "Analysis and Conversion of Documents", Proceedings of the 14th International Conference on Pattern Recognition, vol. 2, Aug. 16-20, 1998, pp. 1089-1091.*

I. Vatton et al., "W3C® Amaya User Manual," Version 7.0, pp. 1-4, Dec. 2002.

T.A. Phelps et al., "Robust Intra-document Locations," http://www9.org/w9cdrom/312/312.html, pp. 1-13, Jan. 2003.

* cited by examiner

```
personnel.xml
<?xml version="1.0" encoding="UTF-8"?>
<!DOCTYPE personnel SYSTEM "personnel.dtd">
<personnel>
    <person>
        <name>Big Boss</name>
    </person>
    <person>
        <name>One Worker</name>
    </person>
    <person>
        <name>Two Worker</name>
    </person>
</personnel>
```

```
personnel.dtd
<!ELEMENT personnel(person+)>
<!ELEMENT person(name+)>
<!ELEMENT name(#PCDATA)>
```

METHOD, SYSTEM AND PROGRAM FOR GENERATING STRUCTURE PATTERN CANDIDATES

FIELD OF THE INVENTION

The present invention relates to techniques for generating candidates for a structure pattern pointing to an element or an element set in a structured document.

BACKGROUND OF THE INVENTION

A structured document is a document involving document elements and logical relationships (document logical structures) between the elements. Structured documents include SGML (Standard Generalized Markup Language) documents and XML (eXtensible Markup Language) documents, for example. SGML is a standard specified by ISO (International Standard Organization), and XML is a standard specified by W3C (World Wide Web Consortium). XML was established so that some functions of SGML can be inherited therein while addressing operational problems of HTML (Hyper Text Markup Language) which is substantially a standard document format for the Internet.

Document conversion and processing is important in such structured documents. For example, PDAs (Personal Digital Assistants) and mobile phones are installed with a web browser recently, but these small-sized mobile terminals are generally equipped with a screen with a limited display area and low-speed communication means. Accordingly, HTML documents for desktop PCs are processed so that only the contents suitable for a small-sized display can be extracted therefrom by means of an XML-compliant annotation language. Furthermore, it is strongly desired to display contents described in XML on an HTML-compliant browser and to easily convert differently formatted data among companies. Accordingly, conversion of contents described in XML into an HTML- or PDF-compliant display format or transformation of XML documents is performed using XSLT (XSL Transformations). XSL (eXtensible Stylesheet Language), a stylesheet language for XML documents, is composed of structural conversion of an XML document to be formatted and vocabulary for describing the meaning of the format to be obtained. The above-mentioned XSLT is the technology for realizing the structural conversion part.

In such conversion/processing of a structured document, an element to be converted/processed is specified by a structure pattern. The structure pattern is an expression pointing to an element in a document logical structure of a structured document, and the term "structure pattern" used herein means an expression by a string of hierarchy specifying items, each of which is composed of a hierarchy specifier specifying the hierarchy/hierarchy group in a targeted structure and an element pattern specifying an element/element set to be selected in the hierarchy. The hierarchy specifying item is hereinafter referred to simply as an "item". XML structure patterns include, for example, a pattern in XPath (in XML Path Language) specified by W3C (World Wide Web Consortium). In an XPath, an item is referred to as a location step. XPath will be described later in more detail as a particular example of a structure pattern.

Specification of a target to be processed by means of a structure pattern, however, involves the following problem. The structure pattern may not point to the original element when the structured document in question is changed. Accordingly, it is necessary to change the structure pattern as the original structured document is changed. However, such a maintenance work must be performed manually, thus requiring a lot of labor. If the structured document in question is an HTML document accessed via the Internet, the contents of which are changed day by day, the problem will be significantly influential.

One existing technology is a method for giving a unique identifier to each element to be specified. For example, in Amaya, a Web authoring tool developed by W3C (World Wide Web Consortium), an element is specified by means of an ID attribute (see I. Vatton et al., "Annotations in Amaya," December 2002). In this specification of an element by means of an ID attribute, change made in the document does not influence the element unless the element itself is deleted. However, specifying an element by means of an ID requires an editing cost and is not a practical solution.

Another existing technology is a method of adapting a structure pattern to any change made in the document after the change (see T. A. Phelps et al., "Robust Intra-document Locations," 9th World Wide Web Conference, 2000). In this method, the original element is searched along the hierarchical structure of the document with its name as a clue and in conformity with a policy. However, there is a problem how to determine the predetermined policy, that is, a predetermined policy for specifying a search range or a search order.

There may be multiple structure patterns pointing to a particular element in a structured document. This will now be described below with an example. FIG. 15(*a*) shows a hierarchical structure of a structured document in a tree form. The document order, that is, the appearance order in the document is an element R130, element A131, element B132, element C133 and element D134. One of structure patterns pointing to the element D134 shown in FIG. 15(*a*) is such that searches sequentially from the parent to a child, then to another child, and so on, that is, a structure pattern expressed as a "child element named D of a child element named B of a child element named A of an element named R". In the XPath notation to be described later, this can be indicated as "/child::R[1]/child::A[1]/child::B[1]/child::D[1]" (first structure pattern). In another structure pattern pointing to the element D134, it can be specified directly from the element R130. In this case, the element D134 is a descendant of the element R130 and can be expressed as a "grandchild element named D of an element named R". In the XPath notation, this can be indicated as "/child::R[1]/descendant::D[1]" (second structure pattern). Similarly, when skipping only the element B132, it can be expressed as a "grandchild element named D of a child element named A of an element named R". In the XPath notation, this can be indicated as "/child::R[1]/child::A[1]/descendant::D[1]" (third structure pattern).

Though the above-mentioned three structure patterns all point to the element D134, the latter two structure patterns have durability against the change in the document described above. Suppose, for example, the element B132 is deleted to change the document, and as a result, the element C133 and the element D134 become child elements of the element A131 (see FIG. 15(*b*)). In this case, the first structure pattern points to an element that does not exist in the document. On the contrary, the latter two structure patterns still continue to point to the element D134. Furthermore, the latter two structure patterns are different in their durability. For example, an element D135 having the same name as the element D134 is added just below the element R130 so that it appears prior to the element A131 (see FIG. 15(*c*)). In this case, the second structure pattern, which is to point to the first grandchild element named D of the element R130, points to the newly added element D135. On the contrary, the third structure pattern, which is to point to the first grandchild element named D of the element A131 of the element R130, continues to point to the original element D134 correctly.

In this way, the above-mentioned problem caused by change made in a document can be solved by using a durable structure pattern. A durable structure pattern, however, is not so simple as a structure pattern searching sequentially from a parent to a child (hereinafter referred to as a "fixed path") and is difficult to create. Furthermore, there are many kinds of durable structure patterns, and thus it is difficult to select a structure pattern most suitable for possible future changes made in a document.

In spite of the situation described above, there is no editing environment for creating a durable structure pattern provided by the existing technology. There are XSLT editing systems including, for example, "eXcelon Stylus" by eXcelon Corporation, "XML Spy" by Altova Corporation, "IBM XSL Editor" by IBM Corporation, etc. Though these editing environments provide a function of automatically generating an XPath, the generated XPath is limited only to a simple, fixed path searching sequentially from a parent to a child. Accordingly, in order to generate a durable structure pattern, a user must edit the fixed path by directly inputting character strings or by utilizing an auxiliary tool selected through a menu. It is thus difficult to generate many kinds of complicated structure patterns. Furthermore, the user is required to have detailed knowledge about structure patterns.

In one existing technology, a user gives an example of a search result and then a structure pattern is automatically created which includes the partial structure in a structured document obtained from the user's example, as the search result (see Published Unexamined Japanese Patent Application No. 7-225771). The technology, however, determines whether or not the structure pattern is correct only based on whether or not the partial structure of a structured document obtained from the user's example is included therein, and it does not positively support creation of a structure pattern with durability. This is because the technology aims only at enabling an intended structure pattern to be easily obtained even by a user without knowledge of the internal structure of structured documents or the grammar of structure patterns. Consequently, the automatically created structure pattern is not always a structure pattern with durability. Furthermore, the user is still required to have detailed knowledge about structure patterns in order to know whether or not the automatically created structure pattern has durability.

Depending on the contents of a structured document, it may be possible to predict a part which may be changed in the future to some extent. Thus, if it is possible to specify the part of the structure pattern that is predicted to be changed in the future as an item desired to be edited and complement the part with a durable expression, then a user will be able to quickly obtain only a structure pattern that is suitable for his purpose from many kinds of structure patterns.

In this respect, in a user interface (such as a shell) handling a UNIX® file system having a tree structure, a function of complementing a file path is provided. In the UNIX® file path, each file hierarchy is separated by "/", and each directory and file is shown as a character string. Under an environment using a bash (Bourne Again SHell), by pressing the Tab key in succession after inputting "1s/home/user", for example, directories and files below "/home/" are shown as "/home/user1", "home/user2", and so on, with the file paths complemented automatically. The function of complementing a file path, however, complements a file path from the top toward the end, and the user must search all the hierarchies from the hierarchy, which is base point in the path, to the hierarchy where the desired information exists. It is impossible to specify a particular hierarchy in the path and automatically complement only the hierarchy.

Thus, there is a demand for realization of a system by which many kinds of complicated structure patterns are automatically generated. Especially, there is a demand for realization of an automatic structure pattern generating system capable of easily selecting an optimum structure pattern among generated structure patterns. In such a system, a user would not be required to have detailed knowledge on structure patterns, thereby preventing errors such as editing mistakes and input mistakes. If many kinds of structure patterns are automatically generated and the user can easily select an optimum structure pattern from them, then the user can deal with various changes made in the structured document, that is, the user is provided with a system with high flexibility. Furthermore, there is a demand for realization of a function of specifying any item in a structure pattern and automatically editing only the item into a durable expression. With such a function, the user could quickly obtain a structure pattern suitable for his purpose without having the trouble of searching all the items from the item to be edited to the item having the element to be pointed to.

SUMMARY OF THE INVENTION

The present invention provides techniques for generating candidates for a structure pattern pointing to an element or an element set in a structured document. The structure pattern generated according to the present invention may be an expression pointing to an element or an element set in a structured document by repeating a hierarchy specifying item composed of a hierarchy specifier and an element pattern.

In one aspect of the invention, a system of the present invention comprises means for determining an item to be edited, means for generating structure pattern candidates, and means for generating a structure pattern candidate list. The system also comprises a storage for storing document logical structure information about a structured document and a condition and index for display for giving selection criteria to a user. When the system of the present invention is given a structure pattern pointing to an element or an element set in the structured document, that is specified by a user, the means for determining an item to be edited determines an item to be edited among the items of the structure pattern. Then, the means for generating structure pattern candidates replaces the item to be edited with items in different expressions based on the document logical structure information about the structured document to generate structure pattern candidates. The means for generating a structure pattern candidate list arranges the generated structure pattern candidates based on the condition and index for display to generate a structure pattern candidate list. Finally, the structure pattern candidate list is displayed and presented to the user.

In another aspect of the invention, a system of the present invention may accept from a user an item desired to be edited that the user desires to edit among the items of the structure pattern to be edited, and determine it as the item to be edited.

According to the present invention, the condition and index for display for giving selection criteria to a user includes, for example, an index showing inclusion relationships between the element sets pointed to by generated structure pattern candidates and the element set pointed to by a specified structure pattern in the structured document, and a countable characteristic quantity showing the characteristic of the generated structure pattern candidate.

Furthermore, according to the present invention, the document logical structure information on the structured document includes, for example, the structured document itself and a document type definition of the structured document.

According to the present invention, a user can obtain a structure pattern candidate list showing many kinds of complicated structure patterns only by specifying to the system a structure pattern pointing to a particular element or an element set in a structured document, thereby avoiding the trouble of input and preventing errors such as input mistakes and editing mistakes. The structure pattern candidates can be arranged based on the condition and index for display and presented as a structure pattern candidate list. Thus, the user can obtain determination criteria for selecting a structure pattern without special knowledge about structure patterns, and thereby selection of structure pattern suitable for his purpose is facilitated.

Furthermore, according to the present invention, a user can specify an item desired to be edited for the structure pattern to be edited. Thus, if it is possible to predict a part which may be changed in the future depending on the contents of the structured document to be edited, then the user can quickly obtain only a structure pattern that is suitable for his purpose from many possible types of structure patterns by specifying the part as an item desired to be edited.

BRIEF DESCRIPTION OF THE DRAWINGS

FIGS. 1(a) and 1(b) are diagrams showing an outline of a system for implementing the methods of the present invention, wherein FIG. 1(a) shows a schematic configuration of a stand-alone computer and FIG. 1(b) shows a schematic configuration of a computer network;

DETAILED DESCRIPTION OF PREFERRED EMBODIMENTS

Figure 1A:
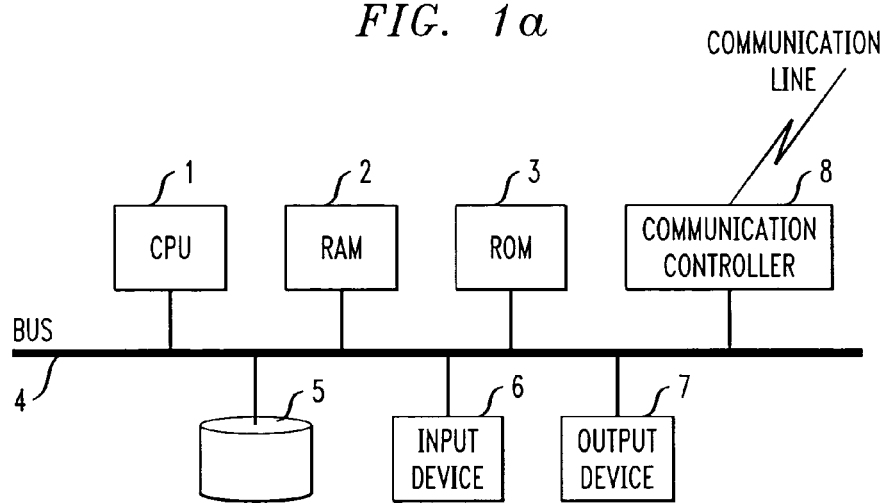

An illustrative embodiment of the present invention will now be described below based on the accompanying drawings. The present invention, however, can be implemented in a variety of aspects and should not be construed to be limited to the description of the embodiment. The same elements are denoted by the same reference numerals through the whole embodiment.

In the embodiment described below, a method and a system are mainly described, but it will be apparent to those skilled in the art that the present invention can be implemented as a computer-readable program in addition to a method and a system. The present invention thus can be implemented in an embodiment as hardware, an embodiment as software, or an embodiment as a combination of software and hardware.

1. System Hardware Configuration

Figure 1B:
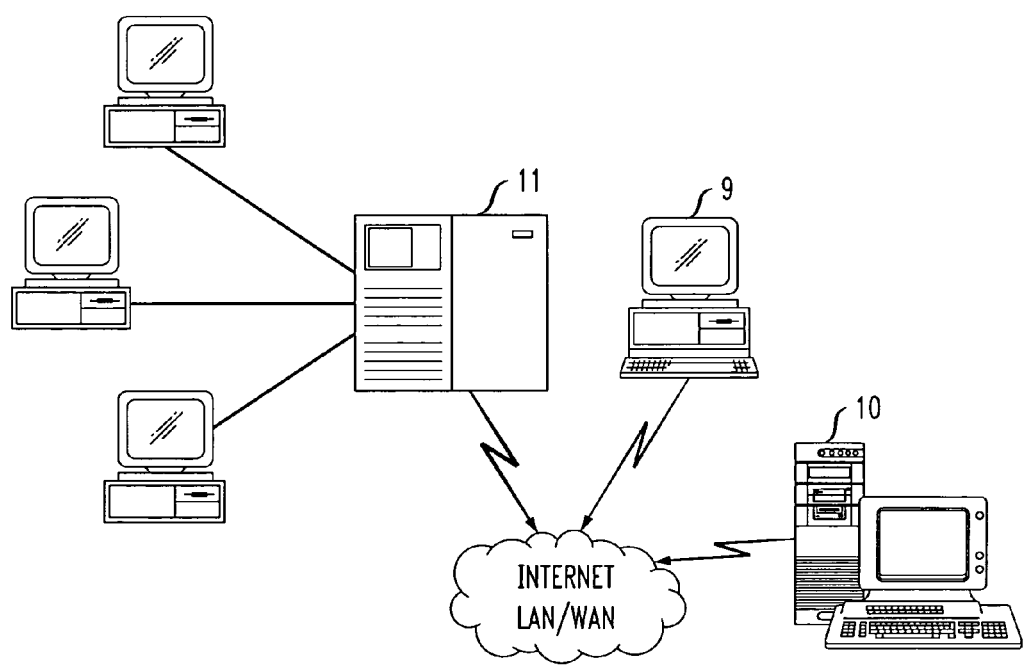

FIGS. 1(a) and 1(b) are diagrams showing an outline of a system for implementing the method of the present invention. The system of the present invention can be implemented in a stand-alone computer system or a computer network comprising multiple computer systems. FIG. 1(a) shows a schematic configuration of a stand-alone computer, and FIG. 1(b) shows a case of a computer network.

The computer system comprises a central processing unit 1 (CPU), a main memory 2 (RAM), a nonvolatile storage 3 (ROM) that are mutually connected via a bus 4. Other equipment such as a coprocessor, an image accelerator, a cache memory, and an I/O controller may be connected to the bus 4. An external storage 5, an input device 6, an output device 7, a communication controller 8 may also be connected to the bus 4 via suitable interfaces. The computer system may, of course, be provided with other hardware resources generally equipped for a computer system.

A typical example of the external storage 5 is a hard disk device but not limited thereto. A magneto-optical storage, an optical storage, and a semiconductor memory such as flash memory are also included in the external storage 5. A read-only storage such as CD-ROM usable only for reading data is also included in the external storage when it is used only for reading data or programs.

The input device 6 may be provided with an input device such as a keyboard and a pointing device such as a mouse. The input device 6 also includes a voice input device. Examples of the output device 7 include a CRT, a liquid crystal display and a plasma display.

When implementing the present invention with multiple computer systems, the computer systems may mutually be connected via LAN/WAN or the Internet as shown in FIG. 1(b). The communication line used for the connection may be either dedicated or public. The computer systems include various types of computers such as a personal computer 9, a workstation 10, and a mainframe computer 11.

In a computer network where multiple computer systems are connected, programs may be distributed so that part of them are executed on a user's computer and part of them are on remote computers. It does not matter at which computer the data used by the programs are stored. As long as information about the data location (address) is known, the data or programs may be stored at any location on computers. Well-known communication technologies can be applied to communication between network computers. For example, protocols such as TCP/IP and HTTP can be used. The location (address) of each file (data or program) stored in each storage can be identified using DNS, URL, etc. The term Internet used herein includes an intranet or an extranet. The phrase "access to the Internet" used herein also means access to an intranet or an extranet. The term "computer network" includes both of a publicly accessible computer network and a computer network for which only private access is permitted.

2. Structure Pattern Candidate Generating System

Figure 2:
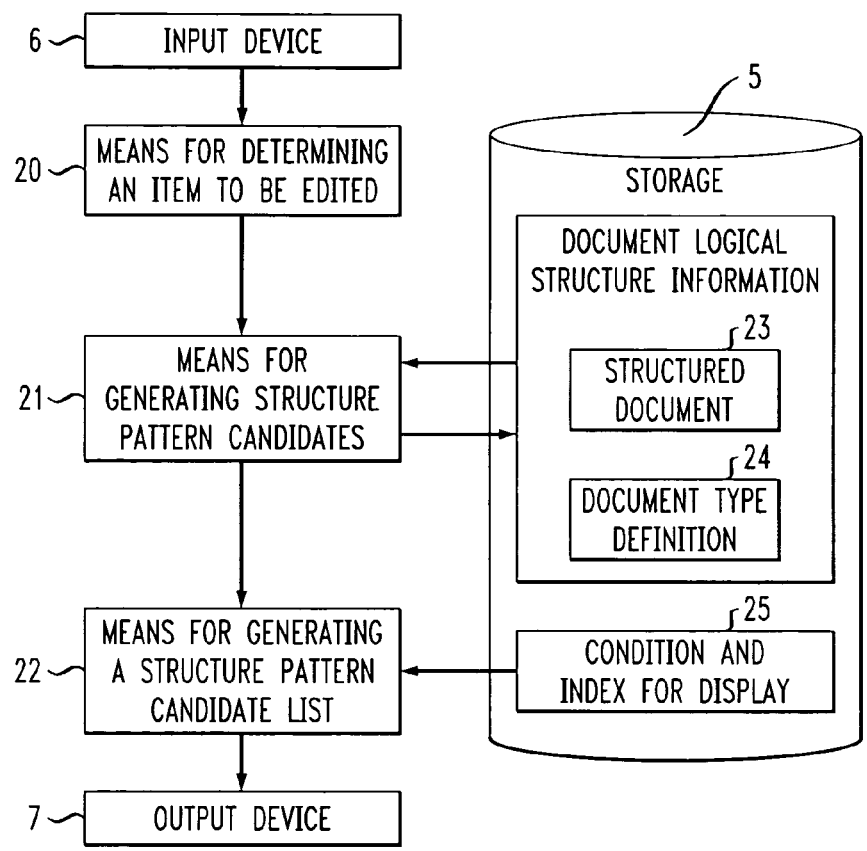
FIG. 2 is a block diagram showing an example of a structure pattern candidate generating system of the present invention.

FIG. 2 shows a schematic configuration of a structure pattern candidate generating system of this embodiment. As shown in FIG. 2, the structure pattern candidate generating system of this embodiment comprises means for determining an item to be edited 20, means for generating structure pattern candidates 21, and means for generating a structure pattern candidate list 22. The structure pattern candidate generating system of this embodiment also comprises an external storage 5, an input device 6 and an output device 7.

The external storage 5 is a storage for storing document logical structure information about the structured document to be the basis for a structure pattern specified by a user and a condition and index for display 25 for giving selection criteria to the user. In the present invention, at least one of a structured document 23 and a document type definition 24 of the structured document is used as the document logical structure information. When both of the structured document 23 and the document type definition 24 exist, the document type definition 24 may be described in the structured document 23. Alternatively, the document type definition 24 may be recorded as a separate document file so that the document type definition file can be referred to in the structured document 23. In this case, though the structured document 23 and the document type definition 24 are stored in the same storage in FIG. 2, they are not necessarily to be stored in the same storage. The condition and index for display 25 is not necessarily to be stored in the same storage as the structured document 23 or the document type definition 24, either.

The input device 6 is a device through which to specify a structure pattern to be edited and an item desired to be edited of the structure pattern. The output device 7 is a device on which a generated structure pattern candidate list is displayed.

The input device 6 may be equipped with an input device such as a keyboard and a pointing device such as a mouse as described above. A user may directly input a structure pattern using the keyboard and the like to specify it to be edited. The user may specify a targeted element on a structured document displayed on the screen of the output device 7 using a mouse and the like. In this case, the fixed path expression for the structure pattern pointing to the element is automatically generated through a well-known technology and displayed on the screen of the output device 7.

The function of the means for determining an item to be edited 20 is performed by execution of program codes stored in the external storage 5, such as a hard disk, described above. The external storage 5 and hardware resources such as the central processing unit 1 and the main memory 2 are mainly utilized. The means for determining an item to be edited 20 has a function of determining an item to be edited among items of a structure pattern given to the system by specification of a user through the input device 6. Since there is no limitation to the location and range of the item to be edited, any combination of items composing the structure pattern (including the case of only one item) is to be edited. When accepting the item desired to be edited that have been specified by the user, the means for determining an item to be edited 20 determines the item desired to be edited as the item to be edited.

The function of the means for generating structure pattern candidates 21 is performed by execution of program codes stored in the external storage 5, such as a hard disk, described above. The external storage 5 and hardware resources such as the central processing unit 1 and the main memory 2 are mainly utilized. The means for generating structure pattern candidates 21 has a function of generating structure pattern candidates by sequentially replacing each of the items to be edited, that have been determined by the means for determining an item to be edited 20, with items in different expressions based on at least one of the document logical structure information about the structured document, that is, the structured document 23, and the document type definition 24 of the structured document. Consequently, the number of structure pattern candidates generated by the means for generating structure pattern candidates 21 is the number of the items in different expressions substitutable for the item to be edited. The editing method will be described later in detail.

The structured document 23 is a document in which the elements of the document are structured with element names, contents of the elements, attributes of the elements, attribute names, attribute values, etc. The structured document 23 includes, for example, XML, SGML and HTML documents. The document type definition 24 is data defining the document type or grammar of the structured document 23, in which the element names, structures, forms of the contents of the elements, etc. are defined and the attributes of the elements are declared to define the attribute names, attribute value forms, default attribute values, etc. The document type definition 24 includes, for example, DTD and XML schemas in the case of XML documents, and DTD in the case of SGML documents.

The function of the means for generating a structure pattern candidate list 22 is performed by execution of program codes stored in the external storage 5, such as a hard disk, described above. The external storage 5 and hardware resources such as the central processing unit 1 and the main memory 2 are mainly utilized. The means for generating a structure pattern candidate list 22 has a function of rearranging the generated structure pattern candidates based on the condition and index for display 25 for giving selection criteria to a user to generate a structure pattern candidate list. As described above, the generated structure pattern candidate list is displayed on the output device 7 and presented to the user.

In the present application, the following are utilized as the condition and index for display 25 for giving selection criteria to a user: an index showing inclusion relationships between element sets pointed to by generated structure pattern candidates and an element set pointed to by a specified structure pattern in a structured document 23; and/or a countable characteristic quantity showing the characteristic of the generated structure pattern candidate. The index showing inclusion relationships and the countable characteristic quantity showing the characteristic will be described later in detail.

3. Method for Generating one or More Structure Pattern Candidates

Figure 3:
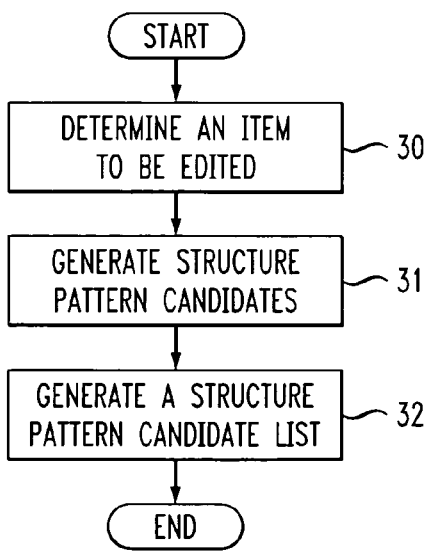
FIG. 3 is a flowchart showing an example of a method for generating one or more structure pattern candidates of the present invention.

FIG. 3 is a flowchart showing the entire operation of a structure pattern candidate generating system of the present invention. At step 30, an item to be edited is determined among the items of a structure pattern specified by a user. Then, at step 31, structure pattern candidates are generated by editing the item to be edited, that has been determined at step 30, to change into different expressions based on at least one of a structured document 23 and the document type definition 24 of the structured document. Finally, at step 32, the structure pattern candidates generated at step 31 are arranged based on the condition and index for display 25, and a structure pattern candidate list is generated and displayed. Each step will now be described in more detail.

Figure 4:
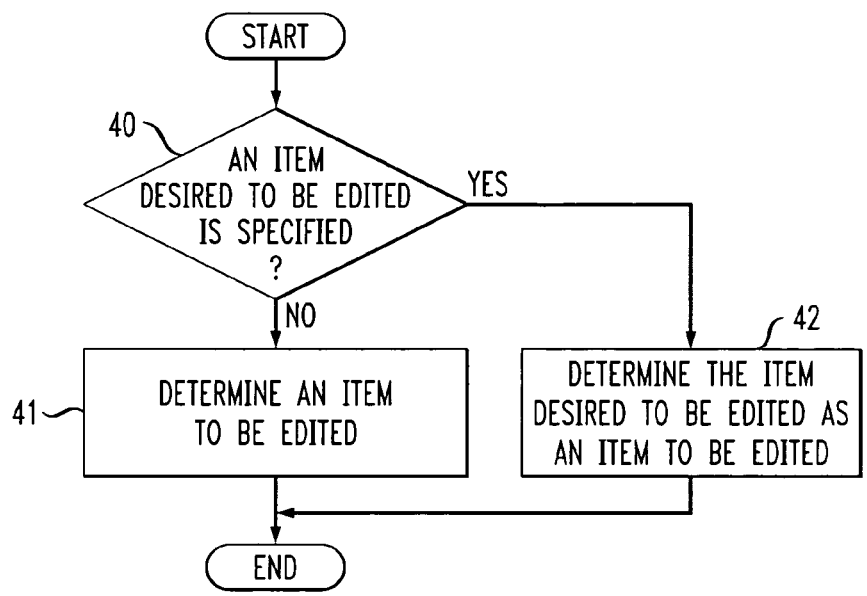
FIG. 4 is a flowchart showing an example of a method for determining an item to be edited.

FIG. 4 is a flowchart showing an example of a method for determining an item to be edited. At step 40, it is determined whether or not any item desired to be edited is specified by the user for the structure pattern specified by the user. If no item desired to be edited is specified, then an item to be edited is determined at step 41. An object of the present invention is to automatically generate many kinds of complicated structure patterns, and there is no limitation to the location and range of the item to be edited. Accordingly, all the combinations of the items of the specified structure pattern are obtained, and each of them is determined as an item to be edited. It is possible to obtain all the item combinations at a time at step 41, and it is also possible to proceed to step 31 in FIG. 3 each time an item combination is obtained and then return to step 41 again after the processing. When an item desired to be edited is specified, it is determined as the item to be edited at step 42. Accordingly, if there is any part that can be predicted to be changed in the future based on the content of the structured document, then only necessary information can be obtained quickly and accurately by specifying an item desired to be edited to identify only one item to be edited.

Figure 5:
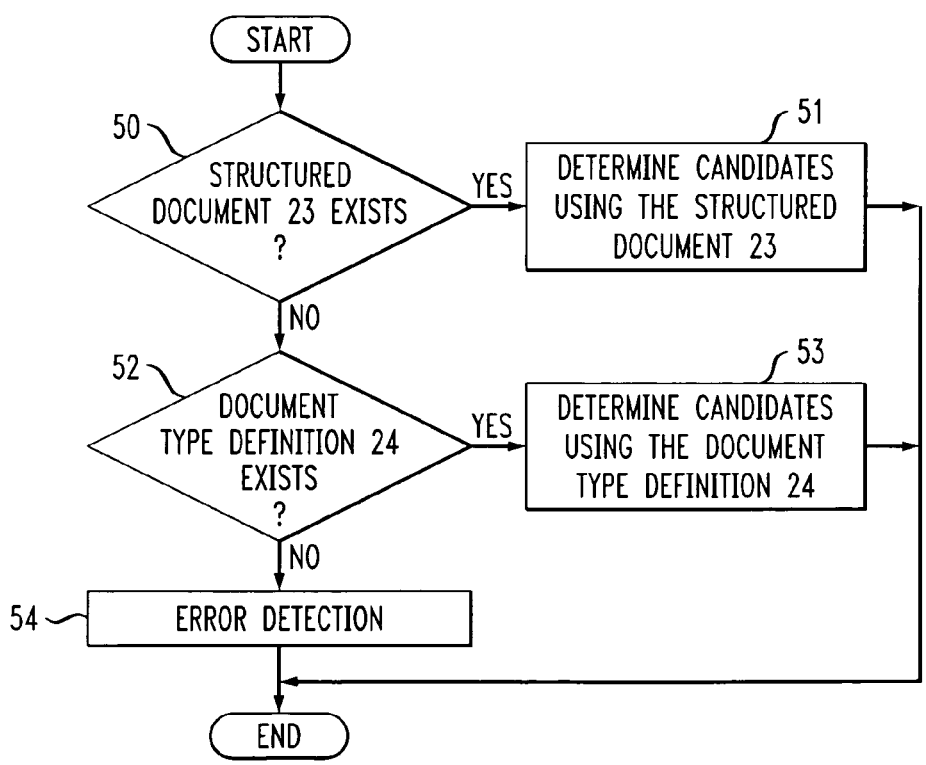
FIG. 5 is a flowchart showing an example of a method for generating one or more structure pattern candidates.
Figure 6:
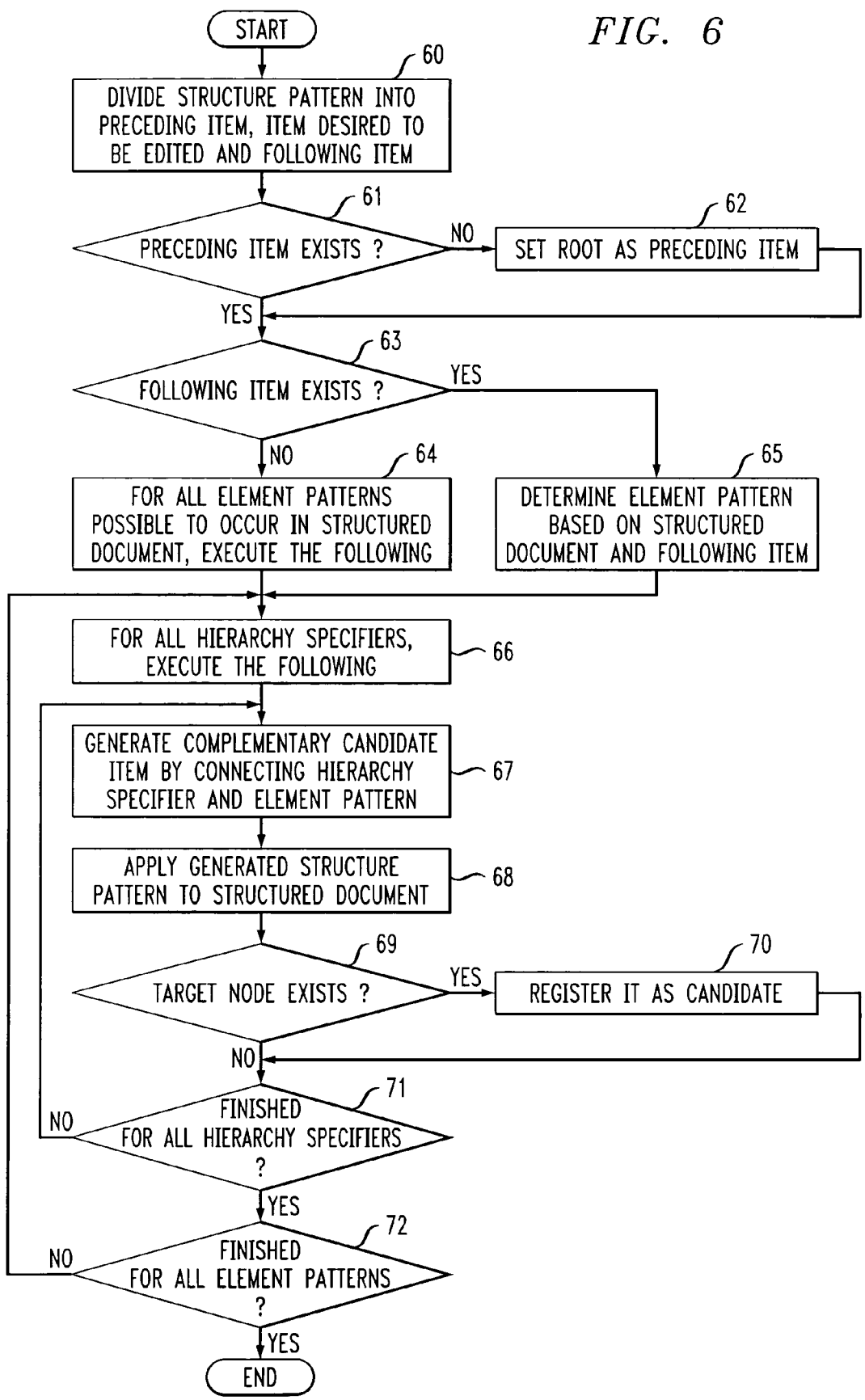
FIG. 6 is a flowchart showing an example of a method for generating one or more structure pattern candidates using a structured document.
Figure 7:
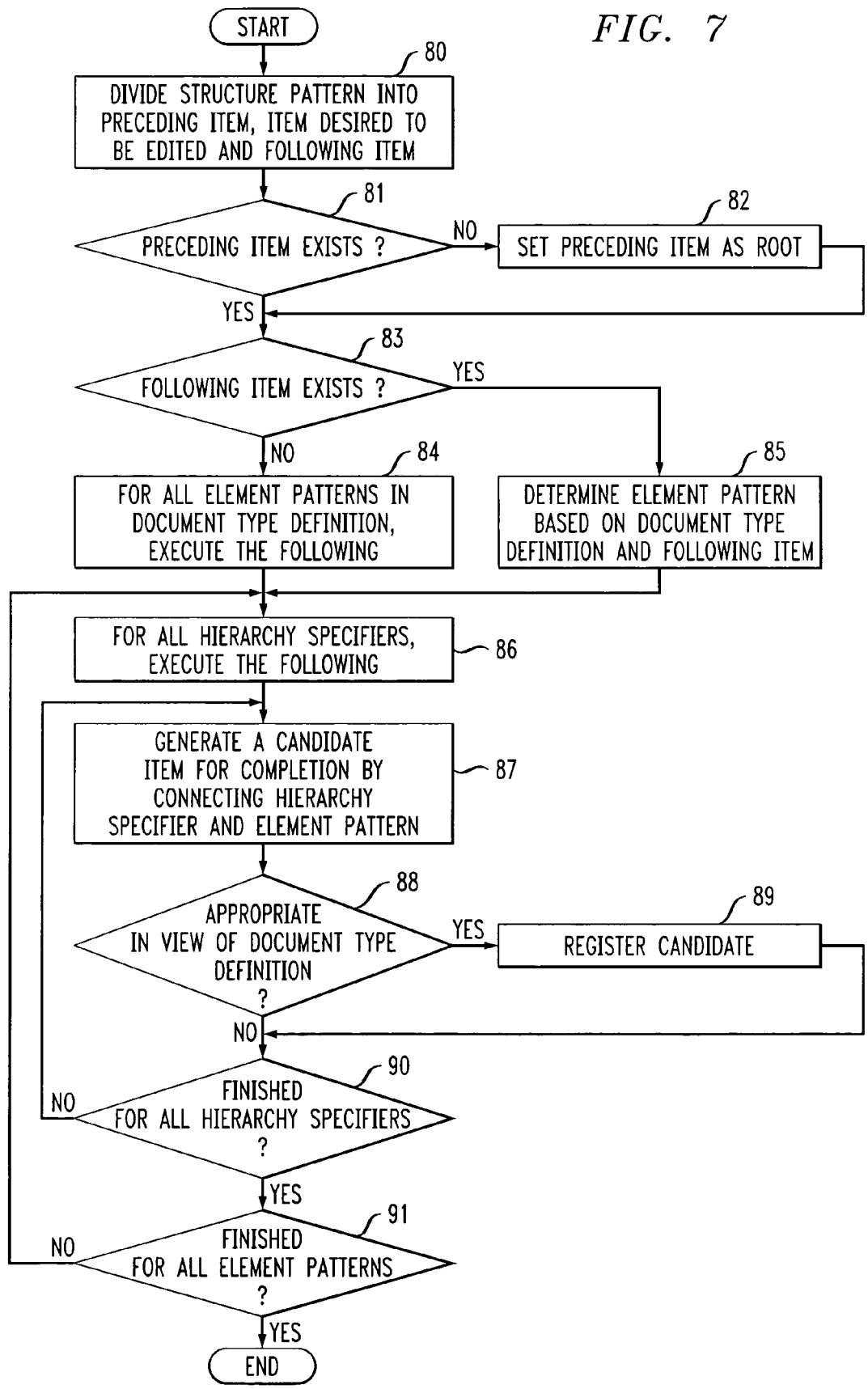
FIG. 7 is a flowchart showing an example of a method for generating one or more structure pattern candidates using a document type definition.

FIGS. 5 to 7 show a flowchart showing an example of a method for generating one or more structure pattern candidates. At step 50 in FIG. 5, it is determined whether or not the structured document 23, which is the source of the structure pattern specified by the user, is stored in the external storage 5. If the structured document 23 is stored, then structure pattern candidates are generated based on the structured document 23 at step 51. If the structured document 23 is not stored, then it is determined at step 52 whether or not the document type definition 24 of the structured document is stored in the external storage 5. If the document type definition 24 is stored, then structure pattern candidates are generated based on the document type definition 24 at step 53. If neither the structured document 23 nor the document type definition 24 is stored in the external storage 5, error is detected at step 54 and the process ends. After structure pattern candidates are generated at step 51 or step 53, it is determined at step 54 whether or not any unprocessed item to be edited remains. If there is any item to be edited left, the process returns to step 50 and repeats the series of steps (steps 50 to 54). Otherwise, the process ends.

FIG. 6 is a flowchart showing an example of a method for generating one or more structure pattern candidates using the structured document 23. Structure pattern candidates are generated by replacing an item to be edited with items in different expressions. As described above, an item of a structure pattern is composed of a hierarchy specifier and an element pattern. Accordingly, to replace an item to be edited with items in different expressions means to determine the hierarchy specifiers and the element patterns of the different items in different expressions. In the description below, the items in different expressions are referred to as "candidate items for completion" for simplification.

First, the structure pattern specified by the user is divided into three parts of a preceding item located before the item to be edited, the item to be edited, and a following item located after the item to be edited based on the item to be edited, that has been determined by the means for determining an item to be edited 20 at step 60. It is then determined at step 61 whether or not the preceding item is obtained for the specified structure pattern as a result of the division performed at step 60. If it exists, the process proceeds to step 63. Otherwise, the root is set as the preceding item at step 62 so that it is indicated that the highest item of the structure pattern has been selected as an item to be edited. It is determined at step 63 whether or not the following item exists for the specified structure pattern. If it exists, then the element pattern of a candidate item for completion is determined based on the following item and the structured document 23 at step 65. If it does not exist, all the element patterns that exist in the structured document 23 are extracted and each of them is determined as the element pattern of a candidate item for completion at step 64.

If there are multiple element patterns determined at step 64 or 65, the following steps 66 to 72 described below are repeatedly executed for each of the element patterns. The process proceeds from step 64 or 65 to step 66, where one of a finite number of hierarchy specifiers is determined as the hierarchy specifier of a candidate item for completion. For all the kinds of hierarchy specifiers, the steps 67 to 71 described below are repeatedly executed. At step 67, the hierarchy specifier determined at step 66 is connected with the element pattern determined at step 64 or 65 to generate a candidate item for completion. At step 68, the structure pattern, which is obtained by connecting the preceding item, the generated candidate item for completion, and the following item in that order, is applied to the structured document 23. At step 69, it is determined whether or not the element pointed to by the structure pattern exists in the structured document 23 as a result of the application. If it is determined to exist, the structure pattern is registered as a structure pattern candidate at step 70. If the element pointed to by the structure pattern does not exist in the structured document 23, from step 70, the process proceeds to step 71 where it is determined whether or not the series of steps 66 to 71 have been executed for all the kinds of hierarchy specifiers. If there is any unprocessed hierarchy specifier left, the process returns to step 67. If all the kinds of hierarchy specifiers have been processed, it is then determined at step 72 whether or not the series of steps 66 to 72 have been executed for all the element patterns determined at step 64 or 65. If there is any unprocessed element pattern left, the process returns to step 66. Otherwise, the process ends.

FIG. 7 is a flowchart showing an example of a method for generating one or more structure pattern candidates using the document type definition 24. The process is almost the same as that of the method for generating one or more structure pattern candidates using the structured document 23. That is, steps 80 through 90 of FIG. 7 are similar to steps 60 through 72 of FIG. 6, except as specified below.

In the case of utilizing the document type definition 24, however, whether or not the generated structure pattern is to be registered as a structure pattern candidate is determined based on whether or not the structure pattern is appropriate in consideration of the document type definition 24, that is, whether or not the generated structure pattern is in conformity with the document type or grammar of the structured document 23, defined by the document type definition 24 (step 88).

4. Particular Example of a Method for Providing Structure Pattern Candidates

Before explaining particular operations of a structure pattern candidate providing system of the present invention, the structured document 23, the document type definition 24 and the structure pattern will now be explained below with particular examples.

Figures 8A, 8B, 8C:
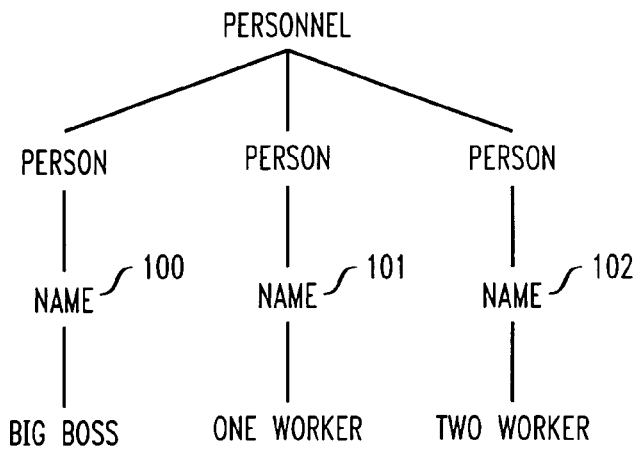
FIG. 8(a) shows an example of a structured document.
FIG. 8(b) shows the document type definition of the structured document of FIG. 8(a)
FIG. 8(c) shows the tree structure of the structured document of FIG. 8(a)

FIG. 8(a) shows an XML document, personnel.xml, as an example of a structured document 23 used in the present invention. The content of an XML document is composed of three parts of an XML declaration, a document type definition and an XML document body. The XML declaration is a description of the XML version and the character code used for the document and is located at the top of the XML document. The XML declaration of the personnel.xml shown in FIG. 8(a) shows that the XML recommendation version is 1.0 and that the character encoding method used for the document is UTF-8 (shown on the first line of the personnel.xml). The document type definition 24 may be recorded as a separate document file so that the document type definition file can be referred to in the structured document 23, as described above.

The personnel.xml shown in FIG. 8(a) refers to document type definition, personnel.dtd (FIG. 8(b)), in the personnel.xml (shown on the second line in the personnel.xml). The XML document body is composed of multiple elements separated by a tag (shown on the third to thirteenth lines in the personnel.xml). In an XML document, an element, which is a basic unit for composing a logical structure of the XML document, is composed of a starting tag, content, and an ending tag. The starting tag is a markup indicating the beginning of an element and composed of a less-than symbol (<) followed by an element type name (tag name) and a greater-than symbol (>). The ending tag is a markup indicating the end of an element and composed of a less-than symbol and a slash (</) followed by an element type name and a greater-than symbol (>). The content is a body part surrounded by the starting tag and the ending tag, which is composed of character data. By inserting child elements into the content, a nest structure, that is, a hierarchical structure can be created. In the personnel.xml shown in FIG. 8(a), child elements named "person" are inserted into the content of the element named "personnel", and child elements named "name" are then inserted into the content of the child elements named "person" to create a three-hierarchy structure. The whole hierarchy forms a tree structure. The tree structure is shown in FIG. 8(c).

A structure pattern points to an element in the structured document forming such a tree structure by repeating an item composed of a hierarchy specifier and an element pattern. As described above, the structure pattern in an XML document is an XPath. Thus, taking an example of an XPath, a particular way of expressing a structure pattern will now be described below.

In an XPath, an item is referred to as a location step, and the location steps are separated by a delimiter "/". In other words, an XPath is such that is composed of more than one location steps (hereinafter referred to as "steps") lined up and separated by a delimiter "/", and the steps are combined in the direction from left to right. Each step sequentially selects a set of nodes relative to a context node (a node being currently processed). A "node" is an element of a tree composing an XML document, which, strictly speaking, includes attributes, a namespace name, a character string in the element, etc. For example, "child::div/child::para" selects a child element named "para" of a child element named "div" of the context node.

A location step is composed of three parts of a reference point, a node test, and zero or more predicates. It is expressed as a reference point and a node test separated by a doubled colon, followed by zero or more expressions enclosed by square brackets. The reference point specifies the tree relationship between a node selected by a location step and a context node. In other words, the reference point is a hierarchy specifier in an XPath. The node test specifies the node type and the qualified name of a node selected with a location step. The predicate uses any expression to select in more detail a set of nodes to be selected using the location step. In other words, the node test and the predicate are element patterns in an XPath. For example, "child::data[2]" selects the second "data" among child elements named "data" of the context node.

In an XPath, thirteen kinds of reference points can be used as a hierarchy specifier. Each reference point will now be described below. A "child" reference point selects child nodes of the context node. A "parent" reference point selects a parent node of the context node. A "descendant" reference point selects descendant nodes of the context node. A descendant node is a child node or a child node of a child node, and so on. An "ancestor" reference point selects ancestor nodes of the context node. The ancestor node is a parent node or a parent node of a parent node, and so on. A "following-sibling" reference point selects all the brother nodes following the context node. A "preceding-sibling" reference point selects all the brother nodes preceding the context node. A "following" reference point is within the same document as the context node and selects all the nodes following the context node in document order, though excluding descendant nodes. A "preceding" reference point is within the same document as the context node and selects all the nodes preceding the context node in document order, though excluding descendant nodes. A "self" reference point selects only the context node itself. A "descendant-or-self" reference point selects the context node and descendant nodes of the context node. An "ancestor-or-self" reference point selects the context node and ancestor nodes of the context node. An "attribute" reference point selects attributes of the context node. A "namespace" reference point selects the namespace of the context node.

Particular operations of the structure pattern candidate providing system will now be described with reference to FIG. 8. The personnel.xml shown in FIG. 8(a) is assumed to be stored as the structured document 23 in the external storage 5. Suppose that a structure pattern pointing to the element "name" 100 shown in FIG. 8(c) is specified to be edited by a user. According to the XPath described above, the fixed path pointing to the element "name" 100 is "/child::personnel[1]child::person[1]/child::name[1]".

A first embodiment is now described in which an item located halfway in a structure pattern is specified by a user as an item desired to be edited. For the structure pattern "/child::personnel[1]child::person[1]/child::name[1]" specified by the user, "/child::person[1]" is further specified by the user as an item desired to be edited. The means for determining an item to be edited 20 determines the "/child::person[1]" as an item to be edited (steps 40 and 42).

Then, the means for generating structure pattern candidates 21 confirms that the structured document, personnel.xml, is stored in the external storage 5 (step 50). When it is confirmed, the means for generating structure pattern candidates 21 divides the structure pattern "/child::personnel[1]/child::person[1]/child::name[1]" and sets the "/child::personnel[1]" as a preceding item and the "/child::name[1]" as a following item, based on information about the item to be edited received from the means for determining an item to be edited 20 (step 60). Then, because the following item exists, the means for generating structure pattern candidates 21 determines an element pattern of a candidate item for completion, that is, a tag name based on the following item "/child::name[1]" and the personnel.xml (steps 63 and 65).

As seen in the tree structure of the personnel.xml shown in FIG. 8(*c*), only "person" is a parent element having an element "name[1]" as a child. Accordingly, the means for generating structure pattern candidates 21 determines "person" as the tag name of the candidate item for completion. Then, the determined tag name "person" is combined with each of all kinds of the hierarchy specifiers, that is, the thirteen kinds of reference points to determine candidate items for completion (steps 66 and 67) such as "/descendant::person" and "/ancestor::person". Structure patterns, which are obtained by connecting the above-mentioned preceding item, each of the determined candidate items for completion, and the following item in that order, are applied to the structured document, personnel.xml (step 68). If, as a result of the application, the element pointed to by a structure pattern exists in the structured document, personnel.xml, then the structure pattern is registered as a structure pattern candidate (step 70).

Taking a candidate item for completion "/descendant::person", obtained by combining the tag name "person" with the reference point "descendant", as an example, the resulting structure pattern will be "/child::personnel[1]/descendant::person/child::name[1]". The structure pattern points to the elements "name" 100 to 102 shown in FIG. 8(*c*). The structure pattern "/child::personnel[1]/descendant::person/child::name[1]" is thus registered as a structure pattern candidate. On the other hand, taking a candidate item for completion "/ancestor::person", obtained by combining the tag name "person" with the reference point "ancestor", as an example, the resulting structure pattern will be "/child::personnel[1]/ancestor::person/child::name[1]". The element pointed to by the structure pattern does not exist in the structured document, personnel.xml. Accordingly, the structure pattern "/child::personnel[1]/ancestor::person/child::name[1]" is not registered as a structure pattern candidate. After checking all the combinations with the thirteen kinds of reference points in this way, the following three structure patterns will finally be registered as structure pattern candidates:

/child::personnel[1]/descendant::person/child::name[1]
/child::personnel[1]/descendant-or-self::person/child::name[1]
/child::personnel[1]/child::person/child::name[1]

All these structure patterns point to an element set consisting of the elements named "name" 100 to 102.

A second embodiment is now described in which consecutive two items in a structure pattern are specified by a user as an item desired to be edited. This is a case of so-called shrink where two items are expressed as one item. The user further specifies "/child::person[1]/child::name[1]" as an item desired to be edited for the structure pattern "/child::personnel[1]/child::person[1]/child::name[1]" he has specified. The means for determining an item to be edited 20 determines "/child::person[1]/child::name[1]" as an item to be edited (steps 40 and 42).

Then the means for generating structure pattern candidates 21 confirms that the structured document, personnel.xml, is stored in the external storage 5 (step 50). When it is confirmed, the means for generating structure pattern candidates 21 divides the structure pattern, "/child::personnel[1]/child::person[1]/child::name[1]" based on the information about the item to be edited received from the means for determining an item to be edited 20, and sets the "/child::personnel[1]" as a preceding item (step 60). Since there is no following item this time, the means for generating structure pattern candidates 21 extracts all the possible element patterns, that is, tag names from the personnel.xml and determines them as the tag names of candidate items for completion (steps 63 and 64). As is apparent from FIG. 8(*c*), the extracted tag names are "personnel", "person" and "name". The steps performed after determination of the tag names, that is, the steps performed for each tag name by the means for generating structure pattern candidates 21 are the same as those performed after determination of a tag name described in relation to the first embodiment. The following structure patterns will finally be registered as structure pattern candidates:

/child::personnel[1]/child::person
/child::personnel[1]/descendant::person
/child::personnel[1]/descendant-or-self::person
/child::personnel[1]/descendant::name
/child::personnel[1]/descendant-or-self::name
/child::personnel[1]/descendant-or-self::personnel
/child::personnel[1]/self::personnel
/child::personnel[1]/ancestor::personnel Among the above structure pattern candidates, those other than "/child::personnel[1]/descendant::name" and "/child::personnel[1]/descendant-or-self::name" do not point to the element "name" 100 pointed to by the original structure pattern. It depends on the content of the condition and index for display 25 to be described below whether or not to provide such structure patterns that do not point to the original element for the user.

Both of the two embodiments described above are cases where an item desired to be edited is specified by the user. When it is not specified by the user, it is pseudoly selected by a program. In other words, the means for determining an item to be edited 20 determines each of all the combinations of the items of the specified structure pattern as an item to be edited. For example, if the specified structure pattern is "/child::personnel[1]/child::person[1]/child::name[1]", then the means for determining an item to be edited 20 obtains five combinations of "/child::personnel[1]", "/child::person[1]", "/child::name[1]", "/child::personnel[1]/child::person[1]" and "/child::person[1]/child::name[1]", and determines each of them as an item to be edited.

5. Method for Generating and Displaying a Structure Pattern Candidate List

Figure 9:
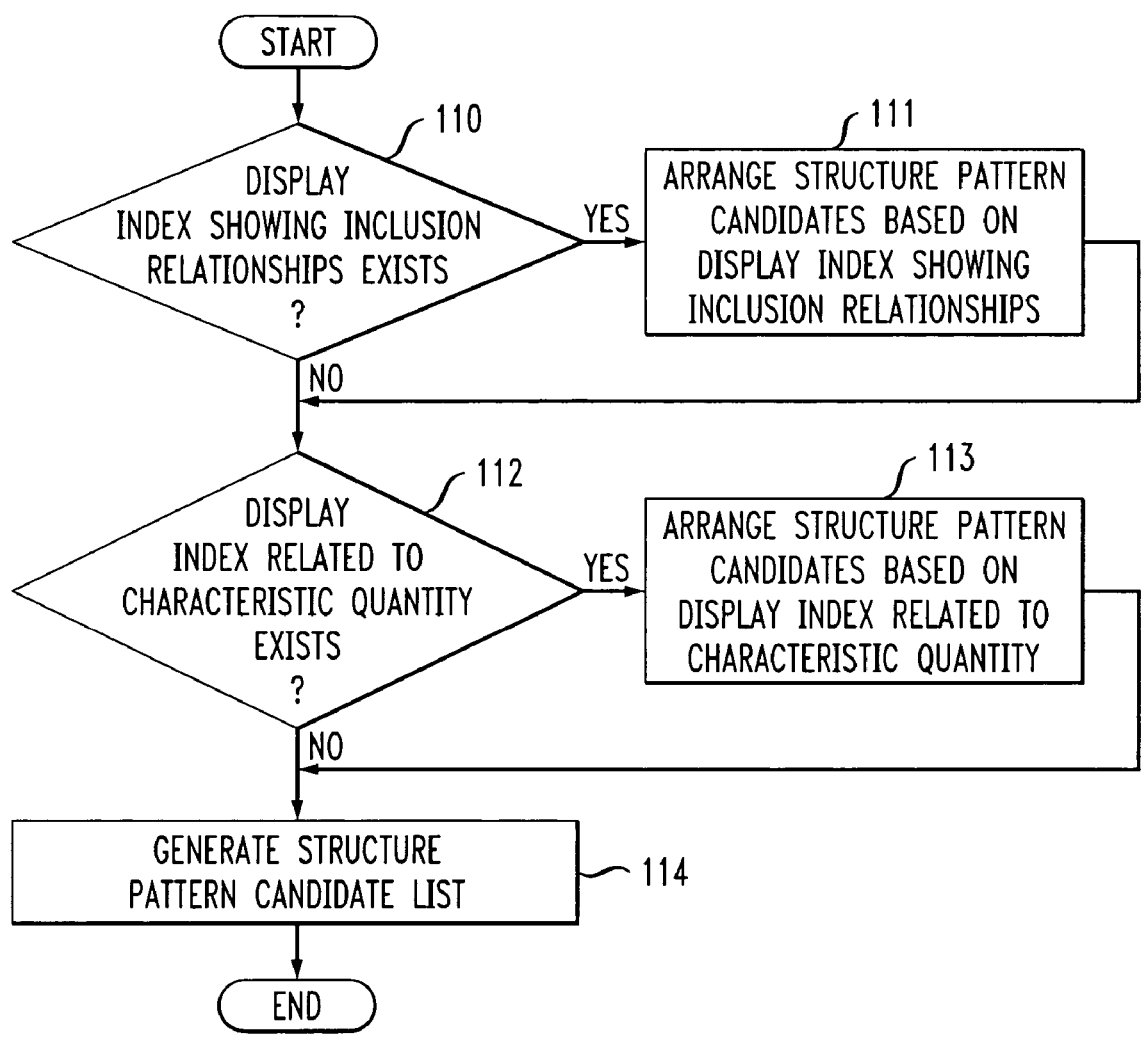
FIG. 9 shows a flowchart showing an example of a method for displaying structure pattern candidates.

FIG. 9 is a flowchart showing an example of a method for generating a structure pattern candidate list. The means for generating a structure pattern candidate list 22 determines at step 110 whether or not a condition and index for display showing inclusion relationships is stored in the external storage 5. If the condition and index for display showing inclusion relationships is stored, structure pattern candidates registered by the means for generating structure pattern candidates 21 are arranged based on the condition and index for display at step 111. Structure pattern candidates that do not belong to any of the inclusion relationships shown by the condition and index for display is excluded from those to be involved in generation of a structure pattern candidate list. It is then determined at step 112 whether or not a condition and index for display related to a characteristic quantity is stored. If it is stored, the structure pattern candidates are arranged based on the characteristic quantity at step 113. As for the structure patterns arranged at step 111, they are again arranged according to the inclusion relationships. At step 114, a structure pattern candidate list is generated based on the structure pattern candidates arranged. If neither of the conditions and indexes for display exists, the means for generating a structure pattern candidate list 22 generates a structure pattern candidate list by simply listing up all the registered structure pattern candidates.

An example of a user interface displaying structure pattern candidates is shown in FIGS. 10 to 13. Suppose that an HTML document, the structured document 23, is stored in the external storage 5. The "Current XPath" field 120 shown in FIGS. 10 to 13 displays the structure pattern specified by a user to be edited. Some of the items of the structure pattern, which are inversely displayed, indicate that they are the items specified by the user as desired to be edited. The checkboxes 121 to 124 shown in the figures are to be used when specifying the structure pattern candidates desired to be displayed among the structure pattern candidates automatically generated.

Figure 10:
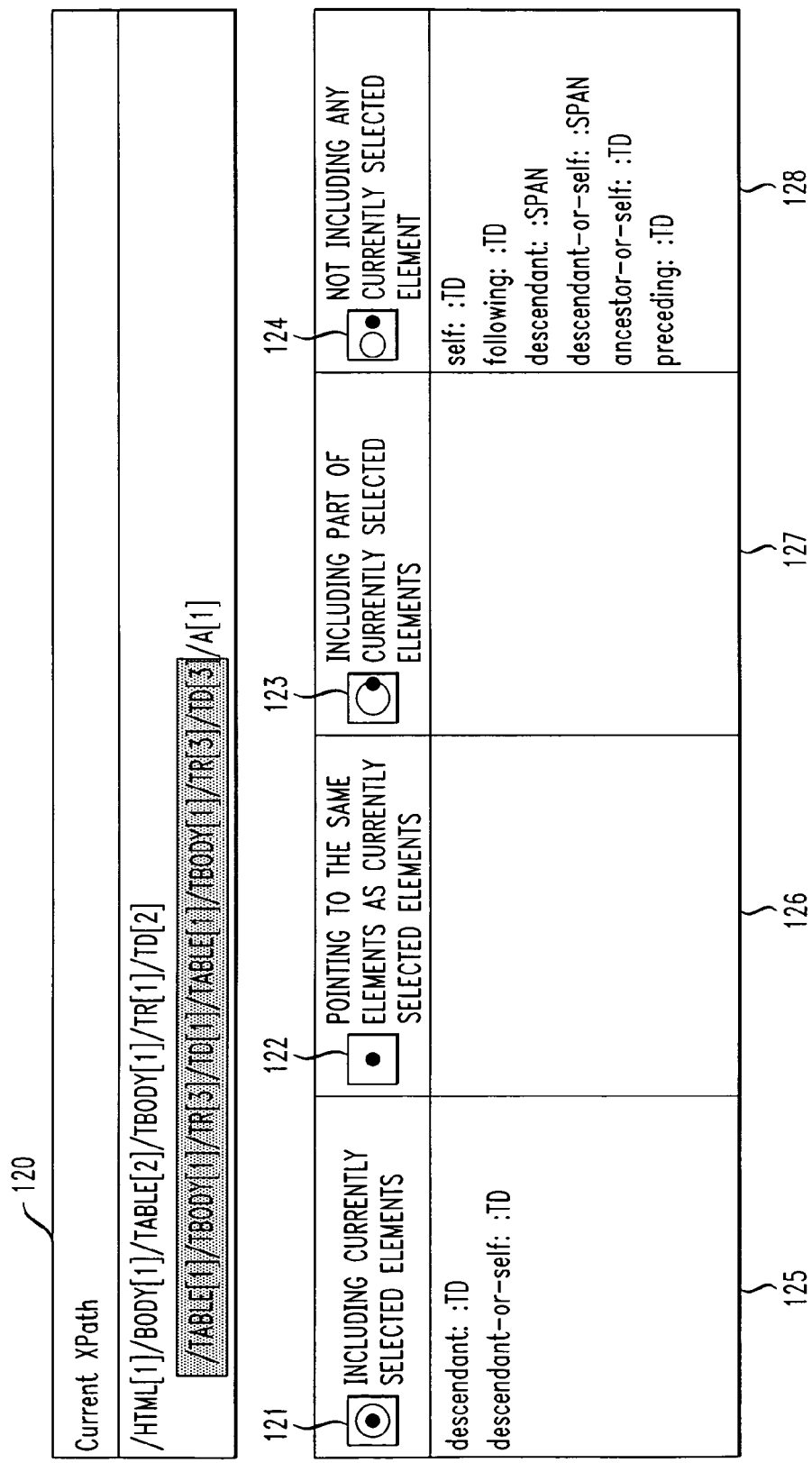
FIG. 10 shows a screen example displaying a structure pattern candidate list generated based on a condition and index for display showing inclusion relationships.

FIG. 10 shows a screen example displaying a structure pattern candidate list generated based on the condition and index for display 25 showing inclusion relationships between the element sets pointed to by structure pattern candidates and the element set pointed to by the original structure pattern (current XPath). The structure pattern candidates registered by the means for generating structure pattern candidates 21 are classified into four based on the condition and index for display 25. The "including currently selected elements" field 125 displays such structure pattern candidates in which the element set pointed to by the structure pattern candidate includes the element set pointed to by the original structure pattern. It is possible to display not the whole expression of structure pattern candidate but only a candidate item for completion part thereof because of restriction to the display area. Two candidate items for completion, "/descendant::TD" and "/descendant-or-self::TD" are shown in FIG. 10. The "pointing to the same elements as currently selected elements" field 126 displays such structure pattern candidates in which the element set pointed to by the structure pattern candidate is the same as the element set pointed to by the original structure pattern. In this embodiment, there is no such structure pattern candidate. The "including part of currently selected elements" field 127 displays such structure pattern candidates in which the element set pointed to by the structure pattern candidate is partially the same as the element set pointed to by the original structure pattern. In this embodiment, there is no such structure pattern candidate. The "not including any currently selected element" field 128 displays such structure pattern candidates in which the element set pointed to by the structure pattern candidate does not include the element set pointed to by the original structure pattern at all.

As shown in FIG. 10, there are six structure pattern candidates classified into this field.

Figure 11:
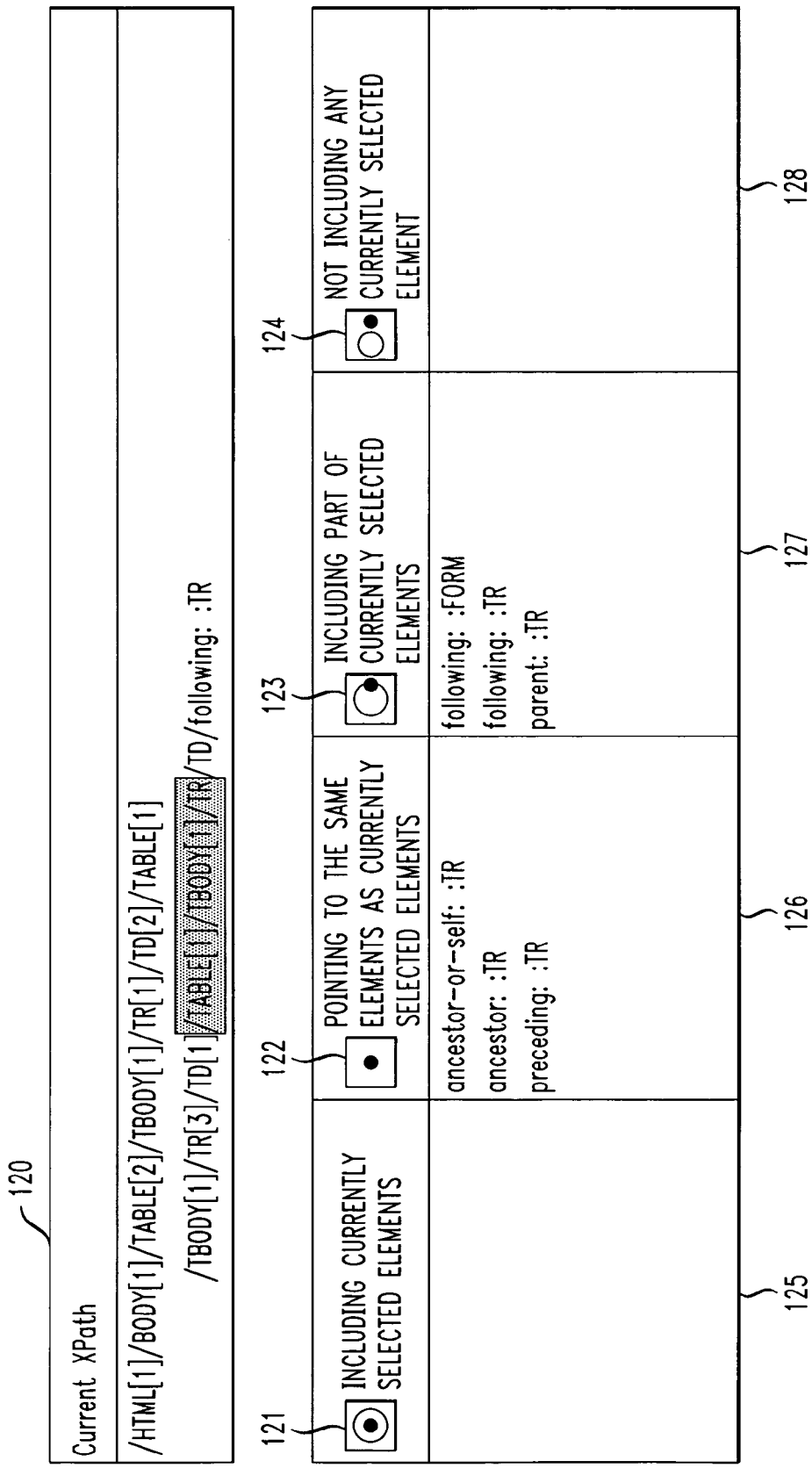
FIG. 11 shows a screen example displaying a structure pattern candidate list generated based on a condition and index for display showing inclusion relationships.

FIG. 11 shows an example where a different XPath is specified as a current XPath under the above-described user interface shown in FIG. 10. As shown in FIG. 11, the six structure pattern candidates registered by the means for generating structure pattern candidates 21 are classified into the "pointing to the same elements as currently selected elements" field 126 and the "including part of currently selected elements" field 127.

According to the embodiments shown in FIGS. 10 and 11, the multiple structure pattern candidates generated automatically are arranged based on the condition and index for display showing inclusion relationships and presented to the user. The user is able to know the relationships between the structure pattern candidates and the current XPath without analyzing them himself. Thus, the user can easily select, from many kinds of structure pattern candidates, a structure pattern that is most suitable for the change characteristic and the like of the targeted structured document based on the arrangement.

Figure 12:
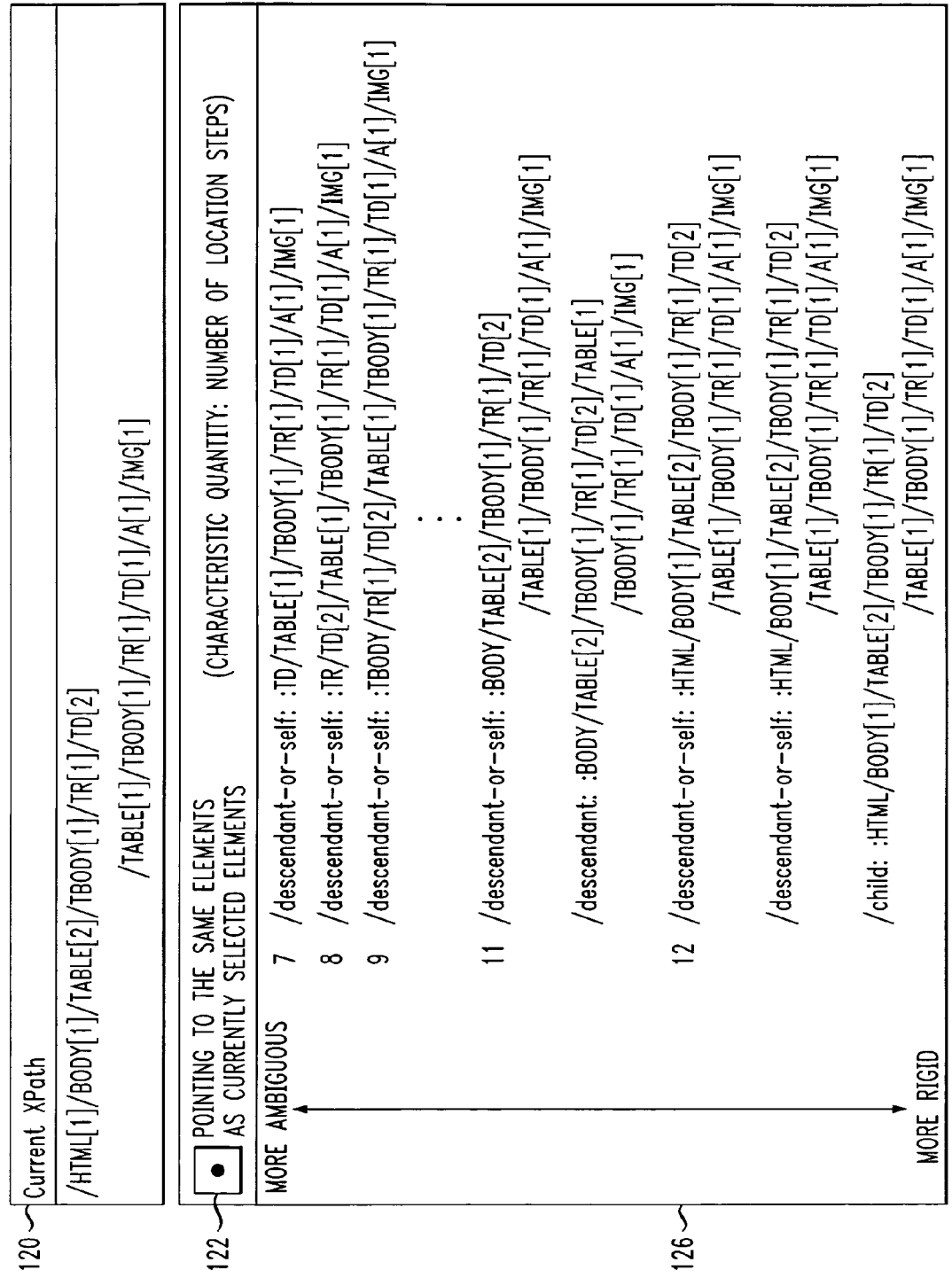
FIG. 12 shows a screen example displaying a structure pattern candidate list generated based on a condition and index for display showing the number of location steps as a characteristic quantity.

FIG. 12 furthermore shows a screen example displaying a structure pattern candidate list generated based on a condition and index for display related to a characteristic quantity. In this case, the characteristic quantity means a countable quantity showing the characteristic of a structure pattern candidate. In the user interface shown in FIG. 12, structure pattern candidates are arranged based on the number of location steps, that is, the number of items as a characteristic quantity. The number of items indicates amount of information. It can be said that the larger the number of the items is, the more rigid the XPath is, and the smaller the number of the items is, the more ambiguous the XPath is. Thus, the number of items also provides an index indicating durability strength of a structure pattern candidate. The number of location steps is added as a characteristic quantity to the above-mentioned condition and index for display here to help the user selecting a structure pattern candidate. In this embodiment, the user does not specify an item desired to be edited. The condition and index for display related to inclusion relationships specifies only structure pattern candidates pointing to the same element set as that pointed to by the current XPath to be displayed. Such specification is preferably performed by checking the checkbox 122 described above. In this way, the user can display only necessary information.

Figure 13:
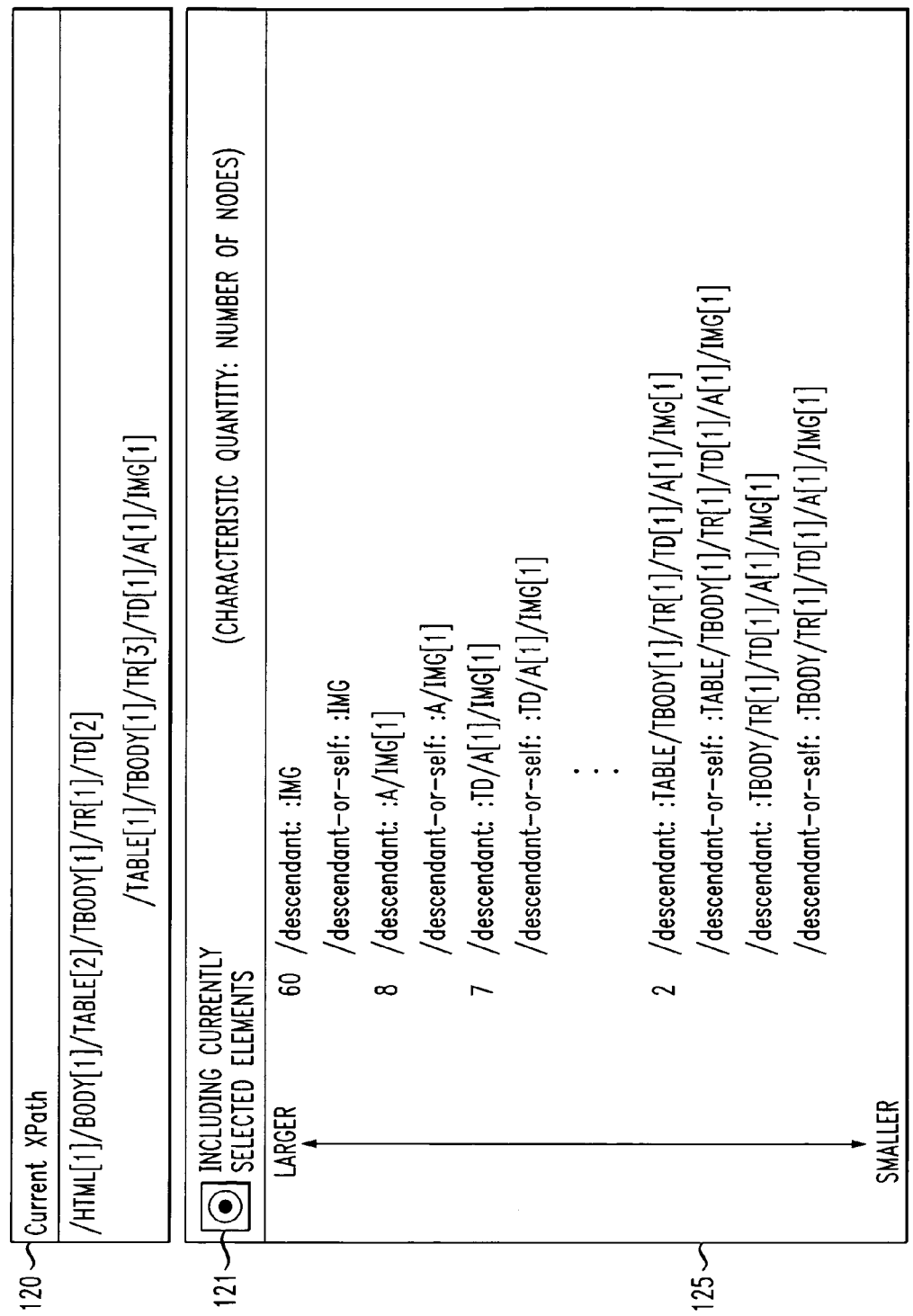
FIG. 13 shows a screen example displaying a structure pattern candidate list generated based on a condition and index for display showing the number of nodes as a characteristic quantity.

FIG. 13 shows a screen example displaying a structure pattern candidate list generated based on a condition and index for display showing the number of nodes (elements) as a characteristic quantity. In this embodiment, the user again does not specify an item desired to be edited. However, the condition and index for display related to inclusion relationships specifies only structure pattern candidates pointing to the element set including the element set pointed by the current XPath to be displayed this time. Consequently, all the element sets pointed to by the displayed structure pattern candidates include the element set pointed to by the current XPath. The number of elements pointed to by each of the displayed structure pattern candidates is different from the others, and it can be said that the larger the number of the pointed elements is, the more ambiguous the XPath is relative to the current XPath. Thus, the number of elements pointed to by a structure pattern candidate also provides an index indicating durability strength of the structure pattern candidate. The number of nodes is added as a characteristic quantity to the above-mentioned condition and index for display here to help the user selecting a structure pattern candidate.

Though, in the embodiments shown in FIGS. 12 and 13, the condition and index for display showing inclusion relationships and the condition and index for display related to characteristic quantity are used at the same time, only the condition and index for display related to characteristic quantity may be used, of course. As shown in FIGS. 12 and 13, by displaying the number of items/nodes together with a structure pattern candidate, a more friendly structure pattern candidate providing system can be provided.

Figure 14:
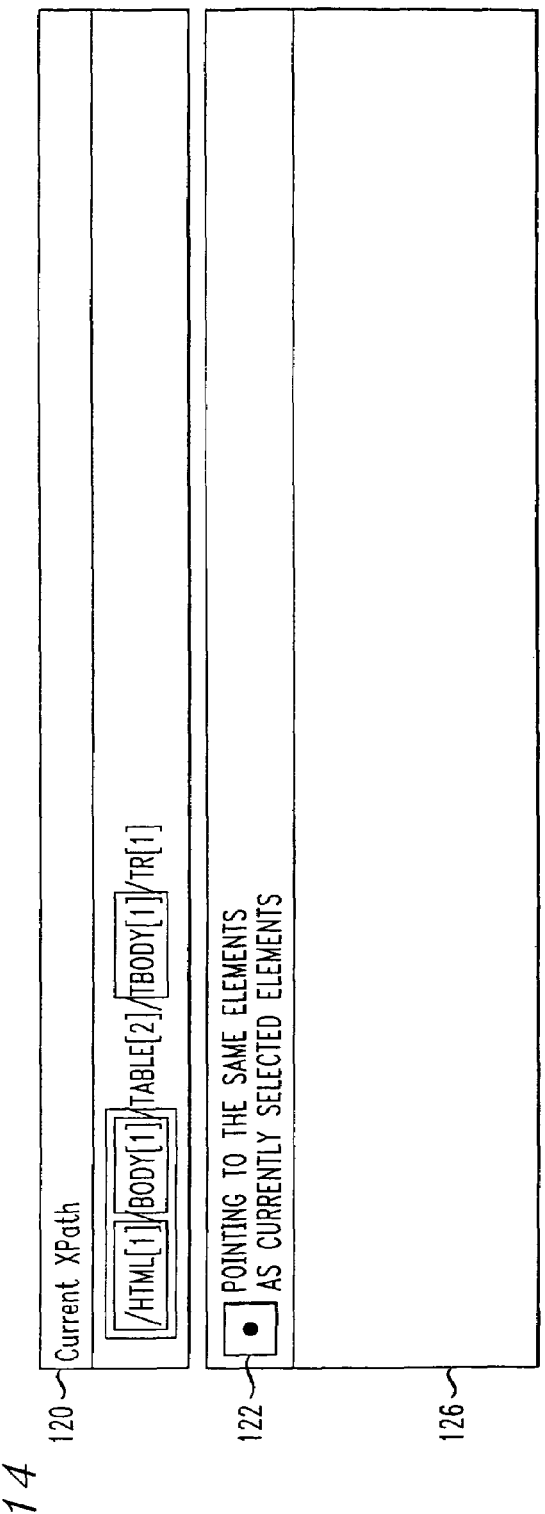
FIG. 14 shows a screen example for supporting selection of an item desired to be edited.
Figure 15C:
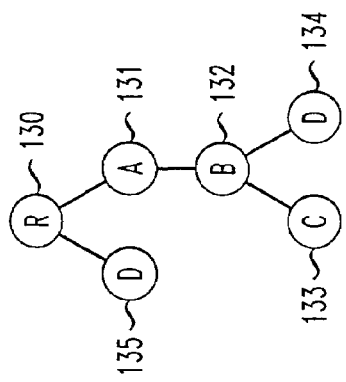
FIG. 15(a) shows a tree structure of a structured document; each of FIGS. 15(b) and 15(c) shows a tree structure of the structured document after some change is made therein.
Figure 15B:
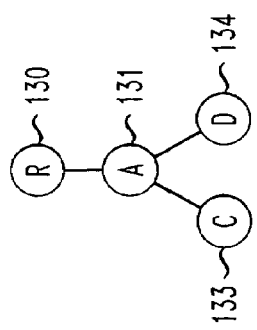
Figure 15A:
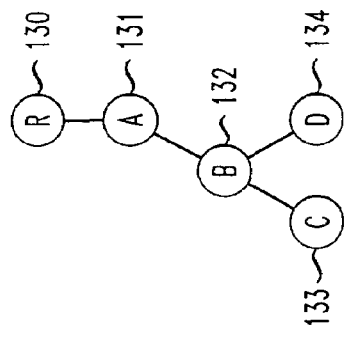

FIG. 14 shows a function of supporting a user in selecting an item desired to be edited. As a principle, the location and the number of items desired to be edited are arbitrary. However, when the condition and index for display specifies only the structure pattern candidates pointing to the same element set as that pointed to by the current XPath to be displayed as shown in FIG. 14, the items selectable as those desired to be edited are limited. Accordingly, this embodiment assists the user's selection by surrounding the items selectable as those desired to be edited with a rectangular frame based on the specification by the condition and index for display.

Though the present invention by the inventor has been concretely described above based on the embodiments of the invention, the present invention is not limited to these embodiments, and various changes may be possible within the scope not departing from the spirit thereof.

Though systems and methods have been mainly described in the embodiments, it is apparent that media in which computer-readable programs are recorded are also disclosed in the above-mentioned embodiments since the functions of these systems and the methods are implemented in a computer-readable program. Such media include not only media built in a storage, such as a hard disk, but also those available separately from the storage, such as CD-ROM, DVD-ROM, flash memory, and a flexible disk.

As a summary, the following items are disclosed with regard to the configuration of the present invention.

(1) A method for generating one or more candidates for a structure pattern pointing to an element or an element set in a structured document, the method comprising the steps of: preparing document logical structure information about the structured document and conditions and indexes for display for giving selection criteria to a user; accepting the structure pattern pointing to an element or an element set in the structured document specified by the user, wherein said structure pattern is composed by one or more items; determining an item to be edited among the one or more items; generating one or more structure pattern candidates by replacing the item to be edited with items in different expressions based on the document logical structure information; and rearranging the generated one or more structure pattern candidates based on the condition and index for display to generate a structure pattern candidate list.

(2) The method for generating one or more structure pattern candidates described in (1), wherein the step of determining an item to be edited comprises the steps of accepting an item specified by the user as desired to be edited for the structure pattern and determining the item desired to be edited as the item to be edited.

(3) The method for generating one or more structure pattern candidates described in (1) or (2), wherein the condition and index for display comprises an index showing inclusion relationships between the element sets pointed to by the generated one or more structure pattern candidates and the element set pointed to by the structure pattern specified by the user in the structured document.

(4) The method for generating one or more structure pattern candidates described in any of (1) to (3), wherein the condition and index for display comprises a countable characteristic quantity showing the characteristic of the generated one or more structure pattern candidates.

(5) The method for generating one or more structure pattern candidates described in any of (1) to (4), wherein the step of preparing the document logical structure information comprises the step of preparing at least one of the structured document and a document type definition of the structured document.

(6) A system for generating one or more candidates for a structure pattern pointing to an element or an element set in a structured document, the system comprising: a storage for storing document logical structure information about the structured document and a condition and index for display for giving selection criteria to a user; means for accepting the structure pattern pointing to an element or an element set in the structured document specified by the user, wherein said structure pattern is composed by one or more items; means for determining an item to be edited among the one or more items; means for generating one or more structure pattern candidates by replacing the item to be edited with items in different expressions based on the document logical structure information; and means for rearranging the generated one or more structure pattern candidates based on the condition and index for display to generate a structure pattern candidate list.

(7) A system for generating one or more structure pattern candidates described in (6), wherein the means for determining an item to be edited comprises means for accepting items specified by the user as desired to be edited for the structure pattern, and means for determining the item desired to be edited as the item to be edited.

(8) The system for generating one or more structure pattern candidates described in (6) or (7), wherein the condition and index for display comprises an index showing inclusion relationships between the element set pointed to by the generated structure pattern candidates and the element set pointed to by the structure pattern specified by the user in the structured document.

(9) The system for generating one or more structure pattern candidates described in any of (6) to (8), wherein the condition and index for display comprises a countable characteristic quantity showing the characteristic of the generated structure pattern candidates.

(10) The system for generating one or more structure pattern candidates described in any of (6) to (9), wherein the storage stores at least one of the structured document and a document type definition of the structured document as the document logical structure information.

(11) A program for generating one or more candidates for a structure pattern pointing to an element or an element set in a structured document; the program causing a computer to perform the functions of: preparing document logical structure information about the structured document and a condition and index for display for giving selection criteria to a user; accepting the structure pattern pointing to an element or an element set in the structured document specified by the user, wherein said structure pattern is composed by one or more items; determining an item to be edited among the one or more items; generating one or more structure pattern candidates by replacing the item to be edited with items in different expressions based on the document logical structure information; and rearranging the generated one or more structure pattern candidates based on the condition and index for display to generate a structure pattern candidate list.

(12) A method for generating one or more candidates for an XPath pointing to an element or an element set in an XML document, the method comprising the steps of: preparing document logical structure information about the XML document and a condition and index for display for giving selection criteria to a user; accepting the XPath pointing to an element or an element set in the XML document specified by the user, wherein said XPath is composed by one or more location steps; determining a location step to be edited among the one or more location steps; generating XPath candidates by replacing the determined location step with location steps in different expressions based on the document logical structure information; and arranging the generated one or more XPath candidates based on the condition and index for display to generate an XPath candidate list.

What is claimed is:

1. A method for generating one or more candidates for a structure pattern pointing to an element or an element set in a structured document, the method comprising the steps of:
preparing document logical structure information about the structured document and conditions and indexes for display for giving selection criteria to a user;
accepting said structure pattern pointing to an element or an element set in said structured document specified by the user, wherein said structure pattern is comprised of one or more items;
determining an item to be edited among the one or more items;
generating one or more structure pattern candidates by replacing said item to be edited with items in different expressions based on said document logical structure information; and
rearranging said generated one or more structure pattern candidates based on said condition and index for display to generate a structure pattern candidate list.

2. The method for generating one or more structure pattern candidates according to claim 1, wherein the step of determining an item to be edited comprises the steps of accepting an item specified by the user as desired to be edited for said structure pattern and determining the item desired to be edited as the item to be edited.

3. The method for generating one or more structure pattern candidates according to claim 1, wherein said condition and index for display comprises an index showing inclusion relationships between the element sets pointed to by said generated one or more structure pattern candidates and the element set pointed to by said structure pattern specified by the user in said structured document.

4. The method for generating one or more structure pattern candidates according to claim 1, wherein said condition and index for display comprises a countable characteristic quantity showing the characteristic of said generated one or more structure pattern candidates.

5. The method for generating one or more structure pattern candidates according to claim 1, wherein the step of preparing said document logical structure information comprises the step of preparing at least one of said structured document and a document type definition of the structured document.

6. A system for generating one or more candidates for a structure pattern pointing to an element or an element set in a structured document, the system comprising:
a storage for storing document logical structure information about the structured document and a condition and index for display for giving selection criteria to a user;
means for accepting said structure pattern pointing to an element or an element set in said structured document specified by the user, wherein said structure pattern is comprised of one or more items;
means for determining an item to be edited among the one or more items;
means for generating one or more structure pattern candidates by replacing said item to be edited with items in different expressions based on said document logical structure information; and
means for rearranging said generated one or more structure pattern candidates based on said condition and index for display to generate a structure pattern candidate list.

7. A system for generating one or more structure pattern candidates according to claim 6, wherein said means for determining an item to be edited comprises means for accepting items specified by the user as desired to be edited for said structure pattern, and means for determining the item desired to be edited as the item to be edited.

8. The system for generating one or more structure pattern candidates according to claim 6, wherein said condition and index for display comprises an index showing inclusion relationships between the element set pointed to by said generated structure pattern candidates and the element set pointed to by said structure pattern specified by the user in said structured document.

9. The system for generating one or more structure pattern candidates according to claim 6, wherein said condition and index for display comprises a countable characteristic quantity showing the characteristic of said generated structure pattern candidates.

10. The system for generating one or more structure pattern candidates according to claim 6, wherein said storage stores at least one of said structured document and a document type definition of the structured document as said document logical structure information.

11. A program for generating one or more candidates for a structure pattern pointing to an element or an element set in a structured document; the program causing a computer to perform the functions of:
preparing document logical structure information about the structured document and a condition and index for display for giving selection criteria to a user;
accepting said structure pattern pointing to an element or an element set in said structured document specified by the user, wherein said structure pattern is comprised of one or more items;
determining an item to be edited among the one or more items;
generating one or more structure pattern candidates by replacing said item to be edited with items in different expressions based on said document logical structure information; and
rearranging said generated one or more structure pattern candidates based on said condition and index for display to generate a structure pattern candidate list.

12. A method for generating one or more candidates for an XPath pointing to an element or an element set in an XML document, the method comprising the steps of:

preparing document logical structure information about the XML document and a condition and index for display for giving selection criteria to a user;

accepting said XPath pointing to an element or an element set in said XML document specified by the user, wherein said XPath is comprised of one or more location steps;

determining a location step to be edited among the one or more location steps;

generating XPath candidates by replacing said determined location step with location steps in different expressions based on said document logical structure information; and arranging said generated one or more XPath candidates based on said condition and index for display to generate an XPath candidate list.

13. Apparatus for generating one or more candidates for a structure pattern pointing to an element or an element set in a structured document, the apparatus comprising:

a memory; and at least one processor coupled to the memory and operative to: (i) prepare document logical structure information about the structured document and conditions and indexes for display for giving selection criteria to a user; (ii) accept said structure pattern pointing to an element or an element set in said structured document specified by the user, wherein said structure pattern is comprised of one or more items; (iii) determine an item to be edited among the one or more items; (iv) generate one or more structure pattern candidates by replacing said item to be edited with items in different expressions based on said document logical structure information; and (v) rearrange said generated one or more structure pattern candidates based on said condition and index for display to generate a structure pattern candidate list.

* * * * *